Aug. 17, 1943.   G. M. MIERLEY   2,327,205
LOCOMOTIVE GEAR CASING SEALING DEVICE
Filed Oct. 2, 1942
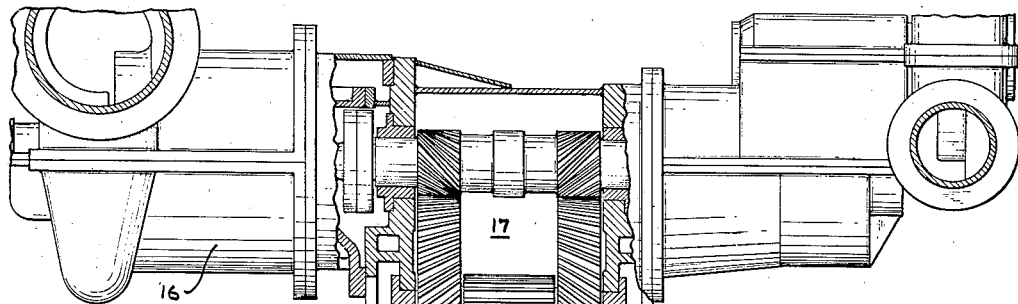
FIG. 1.
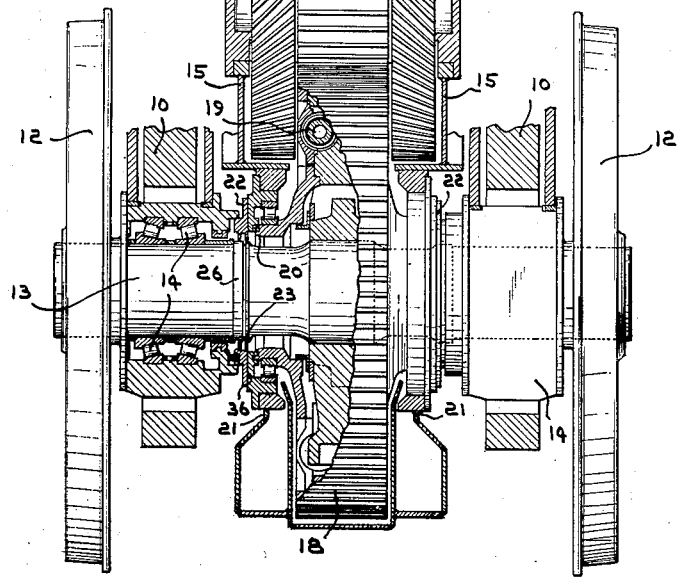
FIG. 2.
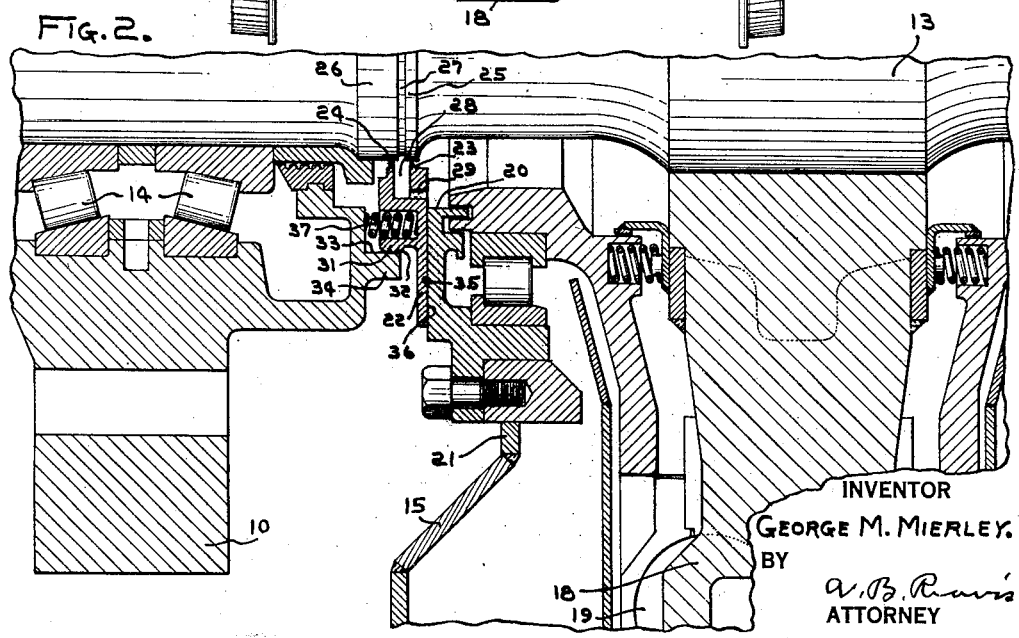
INVENTOR
GEORGE M. MIERLEY.
BY
ATTORNEY Patented Aug. 17, 1943

2,327,205

UNITED STATES PATENT OFFICE 2,327,205

LOCOMOTIVE GEAR CASING SEALING DEVICE

George M. Mierley, Upper Darby, Pa., assignor to Westinghouse Electric & Manufacturing Company, East Pittsburgh, Pa., a corporation of Pennsylvania Application October 2, 1942, Serial No. 460,513

3 Claims. (Cl. 105—108)

The invention relates to gearing for turbine-driven locomotives and it has for its object to provide improved means cooperating with a driving axle, with journal bearings for the latter and with the gear casing to seal the openings of the latter through which the axle extends.

This and other objects are effected by the invention as will be apparent from the following description and claims taken in accordance with the accompanying drawing, forming a part of this application, in which:

Fig. 1 is a fragmentary view of locomotive structure showing the invention applied thereto; and Fig. 2 is an enlarged fragmentary sectional view showing the improved features.

As each driven gear in a geared turbine locomotive is substantially coaxial with a driving axle and connected to the latter, the gear casing necessarily has openings formed in its opposed walls for each axle. These openings should be sealed against oil leakage and against the ingress of foreign matter by means which will not interfere with relative movements of each axle with respect to the gear casing and the frame to which the latter is attached. In accordance with the present invention, annular sealing structures are provided for these openings, each structure having sealing relation with respect to the axle, a journal bearing, and the adjacent wall of the gear casing; and, as the seals with respect to the axle and the bearing are constructed and arranged to provide for relative axial movement without disturbance of the sealing relation, springs are interposed between each journal bearing and the adjacent structure to urge the latter toward the gear casing to maintain sealing engagement thereof.

Referring now to the drawing more in detail, there are shown a locomotive frame 10 and driving wheels 12 carried by driving axles 13. Journal bearings 14 for each axle provide for supporting of the frame by the latter, each journal bearing being connected to the frame in a manner well known in the art to permit of tilting and up-and-down movements of the axle relative to the frame.

A gear casing 15 is attached to and carried by the frame. A turbine 16 is preferably carried by the casing, and reduction gearing, at 17, serves to transmit power from the turbine to one or more driving axles 13, the gearing including a driven gear 18 connected by a suitable coupling 19 to the axle.

As all of the gear members of the reduction gearing, at 17, have their axes fixed in relation to the gear casing 15, the coupling 19 must accommodate for tilting and up-and-down movements of the driving axle. The gear casing has openings 20 in its opposed walls 21 through which each driving axle extends and which must be enough larger than the axle to accommodate relative movements of the latter. Therefore, provision must be made for sealing the openings to prevent the escape of lubricating oil as well as ingress of dust or dirt.

Sealing rings or structures 22 cooperate with the openings 20 to effect sealing of the latter. Each ring member has an inner pair of sealing ring portions 23 and 24 having close clearance with respect to cylindrical lands 25 and 26, respectively, formed on the axle. The axle has an annular groove 27 between the cylindrical lands 25 and 26, and the annular channel 28, between the ring portions 23 and 24, communicates with the interior of the gear casing by means of a suitable passage or passages 29. Thus, each ring is sealed with respect to its axle by means resisting the escape of oil along the latter outwardly, the groove 27 and the space 28 interfering with outward escape and providing for the return of oil through the passage 29.

Each sealing ring member or structure 22 is also sealed with respect to the associated journal bearing by means permitting of relative axial displacement. Accordingly, each such structure has, at its outer side, an outwardly-extending radial flange 31 whose rounded periphery 32 engages the interior cylindrical surface 33 provided on the interior of the axially-extending flange 34 of the associated bearing, the surface being coaxial with the latter.

The gear casing 15 has external flat sealing surfaces 35 extending normally with respect to the axis of the driven gear and the associated sealing ring member 22 has, at its inner side, a cooperating flat sealing surface 36.

Compression springs 37 are interposed between each journal bearing 14 and the associated sealing ring member 22 to urge the latter toward the gear casing so as to maintain the sealing surfaces 35 and 36 in sealing engagement, any necessary axial movements for this purpose taking place without disturbance of the seals of the ring member with respect to the axle and the journal bearing.

From the construction described, it will be apparent that each journal bearing, the associated axle, and the cooperating sealing ring member 22 may move together transversely with respect to the driven gear and the gear casing without disturbing the sealed relation with respect to the latter, the springs keeping the surfaces 35 and 36 in sealing engagement. Also, relative axial movements may occur without disturbing the seal of the ring member with respect to the axle and the journal bearing. The rounded or crowned pheriphery 32 of the flange 31 facilitates movement axially and permits of whatever angular adjustment may be required to keep the surfaces 35 and 36 in sealing engagement.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The combination with a locomotive having a frame, means for supporting the frame including a driving axle fitting journal bearings carried by the frame, means for applying power to the axle comprising reduction gearing including a driven gear and means for connecting the latter in torque-transmitting relation to the axle, and a casing carried by the frame and enclosing and supporting the gearing, said casing having openings in its opposed side walls through which the axle extends; of apparatus for sealing the gear casing openings in relation to the bearings comprising means providing sealing surfaces on said bearings, sealing surfaces provided externally on the gear casing about said openings and being in planes normal to the driven gear axis, ring members having sealing relation with respect to the axle and said sealing surfaces of the bearings and provided with surfaces for engagement with said gear casing sealing surfaces, and springs for urging said ring members toward the gear casing to maintain the surfaces thereof in sealing relation with respect to the gear casing sealing surfaces.

2. The combination with a locomotive having a frame, means for supporting the frame including a driving axle fitting journal bearings carried by the frame, means for applying power to the axle comprising reduction gearing including a driven gear and means for connecting the latter in torque-transmitting relation to the axle, and a casing carried by the frame and enclosing and supporting the gearing, said casing having openings in its side walls through which the axle extends; of apparatus for sealing the gear casing openings in relation to the bearings comprising inwardly-extending flanges formed on said bearings and provided with internal cylindrical sealing surfaces, flat sealing surfaces formed externally on the gear casing about said openings and arranged in planes extending normally with respect to the driven gear axis, ring members having sealing relation with respect to the axle and said internal annular surfaces and provided with flat surfaces for engagement with said gear casing flat surfaces, and springs for urging the ring members toward the gear casing to maintain the flat surfaces thereof in sealing engagement.

3. The combination with a locomotive having a frame, means for supporting the frame including a driving axle fitting journal bearings carried by the frame, means for applying power to the axle comprising reduction gearing including a driven gear and means for connecting the latter in torque-transmitting relation to the axle, and a casing carried by the frame and enclosing and supporting the gearing, said casing having openings in its side walls through which the axle extends: of apparatus for sealing the gear casing openings in relation to the bearings comprising inwardly-extending flanges formed on said bearings and provided with internal cylindrical sealing surfaces; flat sealing surfaces formed externally of the gear casing about said openings and arranged in planes extending normally with respect to the driven gear axis; ring members having sealing relation with respect to the axle, provided with outwardly-extending radial flanges having rounded peripheral edges in sealing relation with respect to said internal cylindrical surfaces, and provided with flat surfaces at sides thereof opposed to said flanges for engagement with said gear casing flat surfaces; and springs interposed between the bearings and the ring members for urging the latter toward the gear casing to effect sealing engagement of said flat surfaces.

GEORGE M. MIERLEY.